United States Patent [19]
Amos et al.

[11] Patent Number: 5,704,765
[45] Date of Patent: Jan. 6, 1998

[54] HIGH CHROMIUM CONTENT WELDING MATERIAL TO IMPROVE RESISTANCE OF CORROSION METHOD AND DEVICE

[75] Inventors: Dennis Ray Amos, Rock Hill, S.C.; Sallie Ann Bachman, Orlando; Jianqiang Chen, Winter Springs, both of Fla.

[73] Assignee: Westinghouse Electric Corporation, Pittsburgh, Pa.

[21] Appl. No.: 668,791

[22] Filed: Jun. 24, 1996

Related U.S. Application Data

[63] Continuation of Ser. No. 512,252, Aug. 7, 1995, abandoned.
[51] Int. Cl.$^6$ .............................. F01D 5/02; B23P 15/00
[52] U.S. Cl. ................ 416/244 A; 29/889.1; 29/889.2; 219/76.12; 228/119
[58] Field of Search .......................... 416/213 R, 244 A; 29/889.1, 889.2, 402.07; 219/76.1, 76.12; 228/119, 225, 226, 262.41, 262.44, 262.4

[56] References Cited

U.S. PATENT DOCUMENTS

| | | |
|---|---|---|
| 2,440,069 | 4/1948 | Bloomberg . |
| 3,133,184 | 5/1964 | Rienhoff et al. . |
| 3,590,454 | 7/1971 | Brass . |
| 3,925,634 | 12/1975 | Mulder . |
| 4,152,816 | 5/1979 | Ewing et al. . |
| 4,224,360 | 9/1980 | Ohnishi et al. . |
| 4,633,554 | 1/1987 | Clark et al. . |
| 4,710,103 | 12/1987 | Faber et al. . |
| 4,897,519 | 1/1990 | Clark et al. . |
| 5,021,629 | 6/1991 | Shimomura . |
| 5,024,582 | 6/1991 | Bellows et al. . |

FOREIGN PATENT DOCUMENTS 62-113804 5/1987 Japan .

OTHER PUBLICATIONS

Clark, R.E. et al., "Experiences with Weld Repair of Low Pressure Steam Turbine Motors", 47th Annual Meeting of the American Power Conference, Apr. 22–24, 1985, Chicago, Illinois.

Clark, R.E. et al., "Development of the Techniques for High Pressure Rotor Weld Repair", Westinghouse Electric Corp. and Mitsubishi Heavy Industries, Ltd. Technical Seminar, Takasago, Japan, Jul. 20–22, 1987.

Milliken, C.K. et al., "Qualification Welding of 12% Chromium Segemental Vanes", Westinghouse Electric Corporation Steam Turbine–Generator Division, The Quadranagle, Orlando, FL. Technical Report TR–85039, Apr. 1, 1985.

Morin, M. and Stoeckli, "Complex Submerged Arc Weld Repairs of Large Rotating Equipment", 1994 EPRI International Conference, Mar. 23–25, 1994, Williamsburg, Virginia.

Phillips, A., ed., "Introductory Welding Metallurgy", American Welding Society, New York, 1968, pp. 118–122.

Schubert, D. et al., "Weld Repair of Geothermal Turbine Rotors a Partnering Approach", *Geothermal Resources Council Transactions* 1992, 16, 567–574.

*Sermatech Review* 1989, *No. 31*, pp. 1–2, "New Services for Industrial Turbines".

Hans–Dieter Steffens et al, "Preliminary Experiments on Electroslag Weld Armo–Plating of Small–Diameter Shafts with a Tape Electrode", Schweissen & Schneiden, vol. 41, No. 2 (Feb., 1989), pp. 78–80).

*Primary Examiner*—Christopher Verdier
*Attorney, Agent, or Firm*—D. G. Maire

[57] ABSTRACT

A low pressure steam turbine and generator low alloy steel disc rotors with extended useful life properties. A ring member of the disc rotor has disposed on it multiple weld layers of ferrous material, forming a weld region. The ring member is made of a low alloy ferrous metal alloy having less than about six weight percent alloying ingredients including chromium. The chromium content of the weld region increases overall from a portion of the weld region adjacent to the ring member to a portion of the weld region farthest from the ring member. This general increase is accomplished using weld metal of a single chromium concentration of between 9% and 17% chromium and varying the welding parameters.

13 Claims, 2 Drawing Sheets

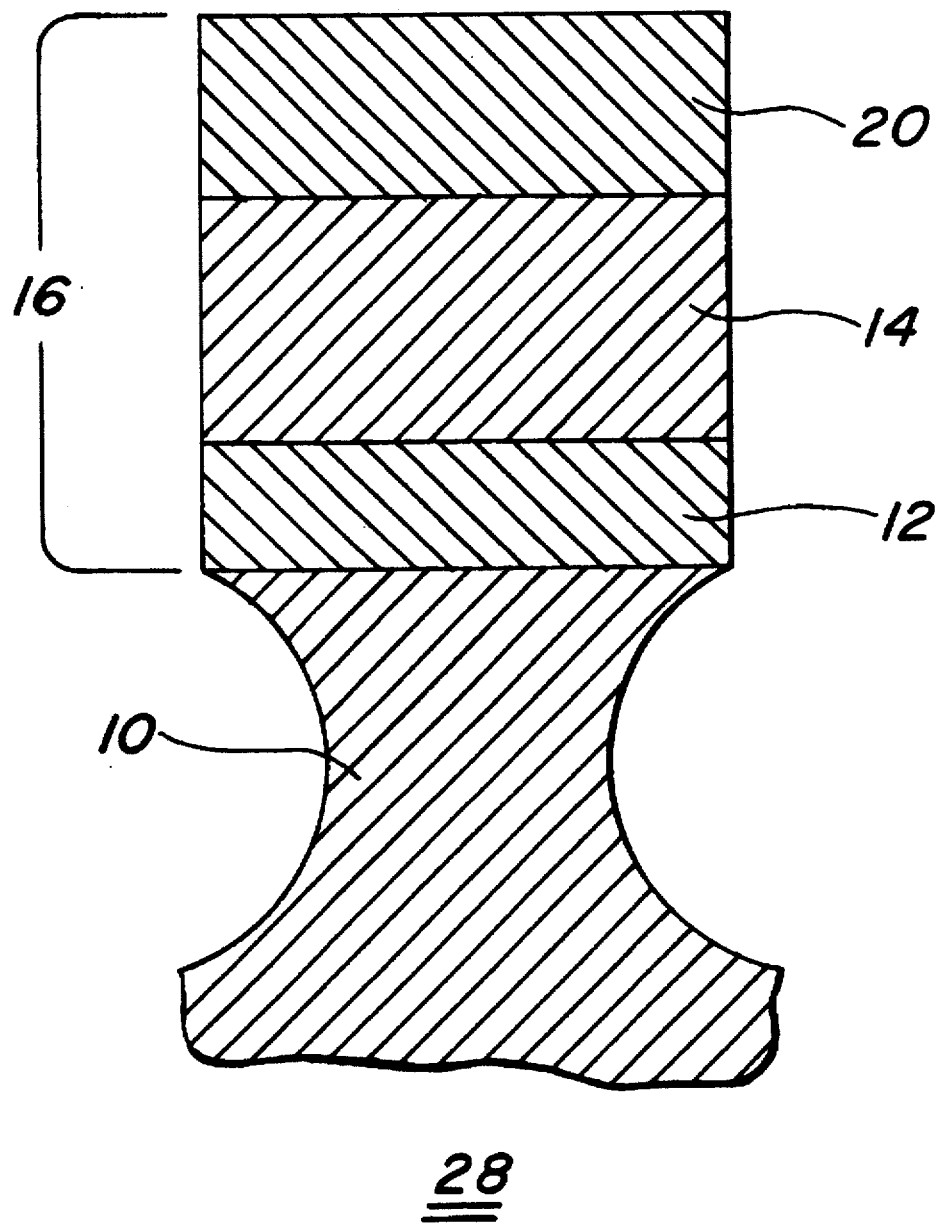

HIGH CHROMIUM CONTENT WELDING MATERIAL TO IMPROVE RESISTANCE OF CORROSION METHOD AND DEVICE

This application is a continuation, of application Ser. No. 08/512,252 filed Aug. 7, 1995, now abandoned.

FIELD OF THE INVENTION

This invention relates to turbine and generator components employed in low pressure steam power plants, and more particularly, to methods of repairing and manufacturing low alloy steel discs and rotors to extend their useful life.

BACKGROUND OF THE INVENTION

Low pressure steam turbine and generator rotors are usually constructed of low alloy steel and contain a number of projecting steeples disposed circumferentially about a disc portion of the rotor for retaining blades. During service, these steeples can experience electrochemical corrosion aggravated by steam borne corrodants; metal loss due to the combination of electrochemical corrosion and corrosion due to the turbine environment; and corrosion cracking induced by a combination of electrochemical corrosion and applied static or cyclic loading. These damage mechanisms evidence themselves by pitting and cracking of the steeples and surrounding disc area or substantial metal wastage and can lead to scrapping the entire turbine rotor at great expense to the operator.

Recent developments in welding, such as improved alloys and low heat input welding techniques, have allowed low alloy turbine rotors to be rebuilt so that new steeples may be machined into the weldment. See Clark, et al., *Experiences with Weld Repair of Low Pressure Steam Turbine Rotors*, 47th American Power Conference, Apr. 22–24, 1985, Chicago, Ill., printed by Westinghouse Electric Corporation, Power Generation, Orlando, Fl. which is incorporated by reference. Despite such useful techniques designed to avert costly scrapping of the rotor, steeples reconstructed from low alloy welds offer little or no improvement in resistance to electrochemical corrosion, or, when subject to the same environmental conditions which caused the pitting and cracking in the original rotor, erosion-corrosion or corrosion cracking.

Artisans have also made rotor repairs by cutting off a defective section of a rotor and welding on a new rotor portion. See U.S. Pat. No. 4,633,554 which is incorporated by reference. Such techniques also do not inherently increase resistance to electrochemical corrosion, or erosion-corrosion or corrosion cracking of the repaired rotor and can result in similar costly repairs.

One approach to repairing steam turbine rotors is taught in commonly assigned U.S. Pat. No. 5,024,582, which is incorporated by reference. In repairing steam turbine rotors, a concern exists for the problem in preventing corrosion. This was solved by gradually increasing the chromium content in the weld region between the low chromium alloy content disc portion of a rotor and the higher chromium content stainless steel steeple of the turbine. The prior art teaches the need to use a collection of welding wires covering a range of chromium compositions to accomplish this goal. The chromium content in each weld layer closer to the stainless steel component is increased by using a welding wire with a higher chromium content. However, the handling of multiple welding wires limits the ease of practicing this prior art.

Commonly assigned U.S. Pat. No. 5,024,582 also discloses the use of austenitic materials for the welding wires. Austenitic materials in the welded condition do not possess the required combination of mechanical properties, including strength, and resistance to corrosion cracking that ferritic materials possess.

It is clear that there is a need for a longer lasting rotor which can resist electrochemical corrosion, erosion-corrosion and corrosion cracking in steam turbine environments, that can be constructed from materials with required mechanical properties, and which can be cost effectively manufactured. It is therefore desirable to provide a steam turbine rotor with a low alloy ferrous base with a higher chromium containing steeple region welded to it using weld metal of a single chromium content higher than that of the low alloy ferrous base, that is resistant to electrochemical erosion, erosion-corrosion, and corrosion cracking.

SUMMARY OF THE INVENTION

According to the invention, there is provided a method of providing a ring member of a low pressure steam turbine component made of a low alloy ferrous base metal containing less than about six weight percent alloying ingredients, including chromium, which extend the life of steam turbine components and the steeple region of rotors. During a welding process, a series of weld layers is disposed on the ring member to create a weld region. The welding metal used during the welding process is a martensitic steel weld metal of a single chromium content in the range of 9% to 17% chromium. The martensitic steel weld metal can be either welding wire or welding rods. The welding process is performed such that the chromium contents of the weld region's first and last weld layers are relatively low and high, respectively, and the chromium content of an intermediate weld layer is either equal to or greater than the chromium content relative to the weld layer directly preceding it. The welding process involves multiple weld passes to dispose a plurality of weld layers on top of one another. The result of the welding process is a steam turbine component with increased electrochemical corrosion, erosion-corrosion, and corrosion cracking resistant properties.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

The accompanied drawings illustrate preferred embodiments of the invention for the practical application of the principles thereof and in which:

FIG. 3: is a cross-sectional view of another rotor embodiment of this invention illustrating a low alloy ring portion combined with a welded steeple region upon which a forging is disposed.

DETAILED DESCRIPTION OF THE PREFERRED EMBODIMENTS

Figure 1:
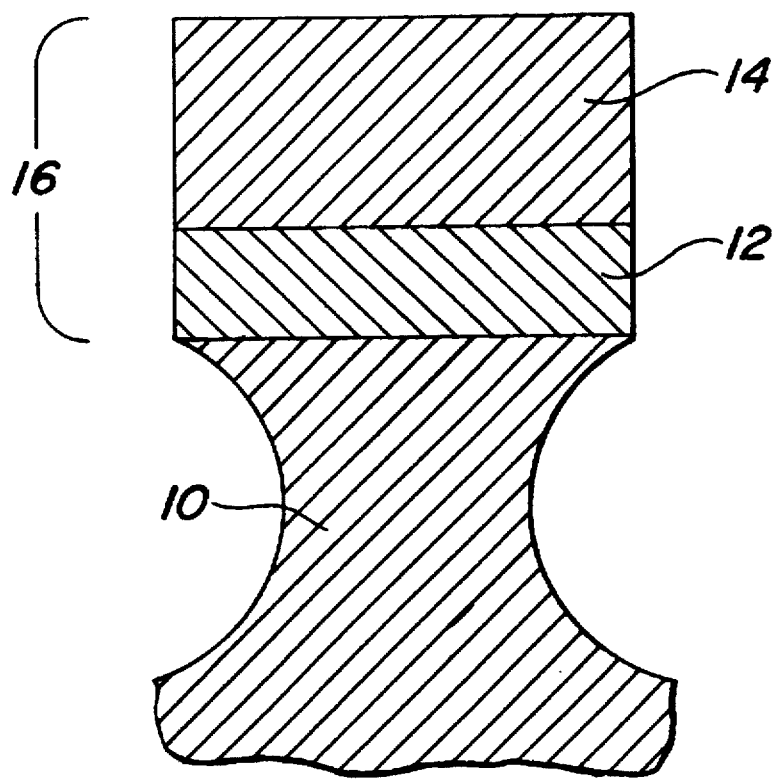
FIG. 1: is a cross-sectional view of a rotor embodiment of this invention illustrating a low alloy ring portion combined with a welded steeple region.

Referring now to the figures, and particularly to FIG. 1, there is shown, in cross-sectional view, the disc portion of a low pressure steam turbine rotor comprised of ring member 10 and steeple region 16, made of low alloy steel having less than six weight percent alloying elements. The typical alloys which have been used in low pressure steam turbine rotors are summarized in Table I below. In addition, chromium-molybdenum-vanadium low alloy steels are generally used in the high pressure section of steam turbines and are equally amenable to the processes of this invention.

TABLE I

Low Alloy Rotor Alloys

| Component | Generic Alloy Name | ASTM Identifications |
|---|---|---|
| LP Rotor | 2.5 NiMoV | A470, Class 2 |
| LP Rotor | 2.5 NiMoV | A470, Classes 3 & 4 |
| LP Rotor | 3.5 NiCrMoV | A470, Classes 5 to 7 |
| LP Disc | 3.5 NiCrMoV | A471, Classes 1 to 3 |
| LP Rotor | 2.0 NiMoV | A293, Classes 2 & 3 |
| LP Rotor | 2.5 NiMoV | A293, Classes 4 & 5 |
| LP Disc | 2.8 NiMoV | A294, Grades B & C |

In the preferred welding process, the ring member 10 is a disc of reduced diameter. Disposed on ring member 10 is steeple region 16. Steeple region 16 is comprised of diluted weld region 12, which is adjacent to ring member 10, and undiluted weld region 14 which has the same nominal composition as the welding wire used to fabricate the steeple. Steeple region 16 is comprised of a plurality of weld layers created during the welding process.

In the welding process, multiple weld passes are made using a weld wire (not shown) with a chromium content of between 9% and 17%. The purpose of the lower boundary of the chromium percentage is to maintain corrosion resistance and to achieve a desired transformation to martensite, which provides strength. The purpose of the upper boundary of the chromium range is to ensure that the required combination of mechanical properties and corrosion resistance are achieved in an economical manner. In the preferred embodiment, the weld wire is 12% chromium. Undiluted weld region 14 is such that its composition is the same nominal composition as the welding wire used to fabricate the steeple. Welding techniques suitable for the purpose of this invention include narrow gap, gas metal arc, submerged arc, gas tungsten arc, laser beam and plasma arc welding techniques. In the preferred embodiment, gas tungsten arc or plasma arc welding techniques are used with welding parameters being 280 amps-300 amps and 11.5–13.5 volts. Reference is also made to *Metals Handbook*, Volume 6, "Welding, Brazing and Soldering", 9th Edition ASM (1983), which is incorporated by reference, which describes the different welding techniques.

Diluted weld region 12 increases in chromium content to achieve a range of compositions which give an acceptable transition, in terms of mechanical and physical properties between the ring member 10 and the undiluted weld region 14, and at the same time achieve acceptable electrochemical corrosion, corrosive-corrosion and corrosion cracking resistance.

The chromium content of diluted weld region 12 is controlled in a number of ways. Two methods to control chromium content is by varying the heat input and the wire feed rate of the welding process. The lower the heat input, the higher the chromium content of a weld layer in diluted weld region 12. The higher the weld wire feed rate, the higher the chromium content of a weld layer in diluted weld region 12. The chromium content of a weld layer is further controlled by the chromium content of material upon which the weld pass is made. The weld layer is composed of the weld wire metal and the material upon which the weld layer is placed. During a weld pass, not only does the weld wire melt, but so does some of the material upon which the weld pass is made. The weld pass creates a weld pool composed of the melted weld wire and the melted material. The melted weld wire and material combine in the weld pool, giving it a substantially homogenous chromium content. The weld pool cools, solidifies, and becomes the weld layer with a chromium content between that of the welding wire and the material the weld layer is placed on. Using these techniques to increase the chromium content throughout diluted weld region 12 is sufficient to give an acceptable transition.

Besides chromium, the weld metal is also comprised of varying amounts of other alloy metals. To provide desired strength to meet design requirements of 55 to 80 kilograms per millimeter squared yield strength in low pressure steam turbines, the weld metal can contain up to 0.25% vanadium, 2.5% molybdenum, and 0.5% tungsten. However, too much of these alloy metals can result in undesirable low weld toughness. Nickel can be present up to 5.5% to increase toughness, but any higher and the possibility of the undesirable austenite forming in steeple region 16 increases. Carbon being present from 0.07% to 0.15% is needed for carbide formation in steeple region 16. However, too much carbon increases the propensity for cracking, particularly during welding. Also, for every increase in the amount of carbon there is an undesirable corresponding increase in hardness and decrease in toughness. Further, increasing the amount of carbon requires raising post welding heat treatment temperatures, resulting in an undesirable decrease of rotor strength.

Figure 2:
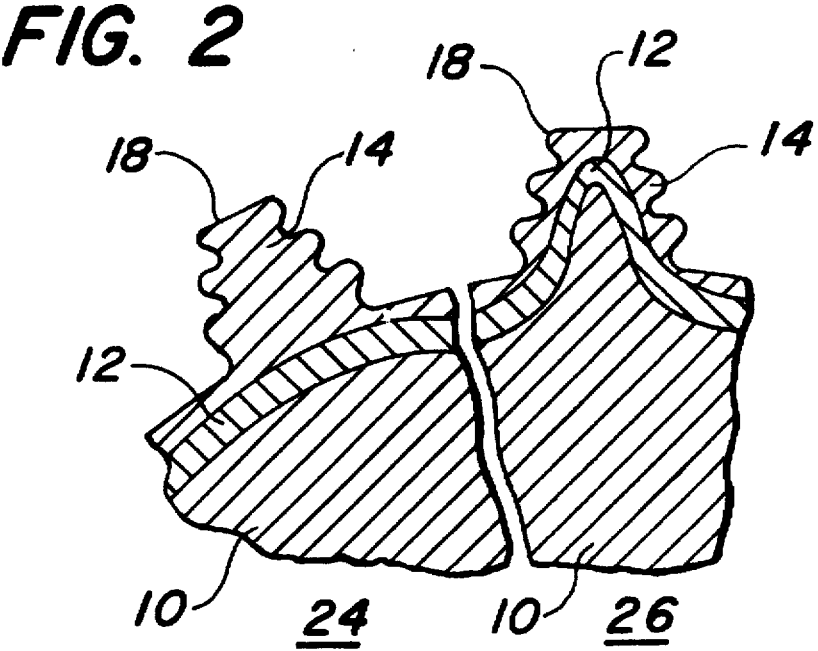
FIG. 2: are partial side views of two different machined rotor embodiments illustrating the portions of the steeple region constructed from both the steeple alloy and multiple weld layers.

FIG. 2 shows the same embodiment of FIG. 1 except that instead of a cross-section of steeple region 16 being shown, a side view of final machined steeple 18 is shown. In design 24, the undiluted weld region 14 has adequate or superior mechanical properties to the ring member 10. Simplicity in welding is optimized by circular welding profiles in this example.

When ring member 10 has some superior mechanical properties over the undiluted weld region 14, steeple design 26 may be the more appropriate choice. In this embodiment, the ring member 10 is extended into machined steeple 18. This enhances the mechanical properties of the steeple region by conferring to it some of the superior mechanical properties of ring member 10. Also, diluted weld region 12 and undiluted weld region 14 involve the depositing of fewer weld layers.

FIG. 3 shows another embodiment of the invention, represented by steeple design 28. In this embodiment, steeple forging 20 is incorporated into steeple region 16, and more specifically, disposed on the surface of undiluted weld region 14. The purpose of incorporating steeple forging 20 is to decrease repair or modification time spent directly on ring member 10. In other embodiments, steeple forging 20 is disposed on diluted weld region 12 or a portion of steeple forging 20 penetrates one or both of weld regions 12 and 14 (not shown).

The foregoing establishes that this invention provides improved repair and original equipment manufacturing procedures for applying steeple portions having improved electrochemical corrosion, erosion-corrosion and corrosion cracking resistance for steam turbines and discs. The welding techniques described herein produce a gradual compositional change between a preferred stainless steel steeple portion and a low allow rotor portion so as to provide optimum mechanical and metallurgical properties.

Although various embodiments have been illustrated, this is for the purpose of describing, and not limiting the invention. Various modifications, which will become apparent to one skilled in the art, are within the scope of this invention and are described in the attached claims. Therefore, it is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A method of preparing a steam turbine component for optimizing a life extending property of a steeple region of said component, comprising:
    (a) providing a low alloy ferrous ring member having less than about six weight percent alloying ingredients including chromium; and
    (b) building a weld region adjacent to the ring member, to create a steeple region, by depositing weld metal in a plurality of weld passes, the weld metal having a single chromium content, the single chromium content being between 9% and 17% chromium, the weld region increasing overall in chromium content from a portion of the weld region adjacent to the ring member to a portion of the weld region farthest from the ring member.

2. The method of preparing a steam turbine component of claim 1, wherein the turbine component has a design strength range between 55 and 80 kilograms per millimeter squared.

3. The method of preparing the steam turbine component of claim 2, in which the weld metal further comprises:
    (a) between 0.0% and 0.25% vanadium;
    (b) between 0.0% and 2.5% molybdenum;
    (c) between 0.0% and 0.5% tungsten;
    (d) between 0.0% and 5.5% nickel; and
    (e) between 0.07% and 0.15% carbon.

4. The method of preparing the steam turbine component of claim 3 in which the weld metal is 12% chromium.

5. The method of preparing the steam turbine component of claim 1 in which the weld region is a martensitic phase.

6. The method of preparing the steam turbine component of claim 5 further comprising providing the ring member with greater mechanical properties compared to the steeple region, the ring member and the steeple region configured and arranged such that the ring member extends into the steeple region.

7. The method of preparing the steam turbine component of claim 6, further comprising the step of incorporating a chromium-containing steeple forging into the steeple region.

8. A method of preparing a low pressure steam turbine rotor having a design strength range between 55 and 80 kilograms per millimeter squared, for optimizing a life extending property of a steeple region of said rotor, comprising:
    (a) providing a low alloy ferrous ring member having less than about six weight percent alloying ingredients including chromium; and
    (b) building a martensitic weld region adjacent to the ring member, to create a steeple region, by making a plurality of weld passes using a single weld metal comprising:
        (i) 12% chromium,
        (ii) between 0.0% and 0.25% vanadium,
        (iii) between 0.0% and 2.5% molybdenum,
        (iv) between 0.0% and 0.5% tungsten,
        (v) between 0.0% and 5.5% nickel, and
        (vi) between 0.07% and 0.15% carbon;
    the weld region increasing overall in chromium content from a portion of the weld region adjacent to the ring member to a portion of the weld region farthest from the ring member.

9. A method of preparing a steam turbine rotor for optimizing a life extending property of a steeple region of said rotor, comprising:
    (a) providing a low alloy ferrous ring member having less than about six weight percent alloying ingredients including chromium; and
    (b) building a martensitic weld region adjacent to the ring member, to create a steeple region, by depositing weld metal in a plurality of weld passes, the weld metal having a single chromium content between about 9% and 17% chromium, the weld region increasing overall in chromium content from a portion of the weld region adjacent to the ring member to a portion of the weld region farthest from the ring member.

10. The method of preparing a steam turbine rotor of claim 6, wherein the weld metal has a single chromium content of 12% chromium.

11. A method of preparing a turbine component for optimizing a property of a region of said component, said method comprising the steps of:
    providing a ferrous member of said turbine component comprising a first percentage of an alloying metal; and
    building a weld region adjacent to said ferrous member by depositing a single weld metal in a plurality of weld passes, said weld metal comprising a second percentage of said alloying metal, said second percentage being greater than said first percentage, said weld region increasing in percentage content of said alloying metal from a first portion of said weld region adjacent to said member to a second portion of said weld region farthest from said member.

12. The method of claim 11, further comprising the step of varying heat input during the step of building a weld region to control the percentage content of said alloying metal in said weld region.

13. The method of claim 11, further comprising the step of varying the weld metal feed rate during the step of building a weld region to control the percentage content of said alloying metal in said weld region.

* * * * *